US012591776B2

(12) United States Patent (10) Patent No.: US 12,591,776 B2
Lee et al. (45) Date of Patent: Mar. 31, 2026

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Dongsoo Lee, Suwon-si (KR); Sejung Kwon, Suwon-si (KR); Byeoungwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1047 days.

(21) Appl. No.: 17/520,326

(22) Filed: Nov. 5, 2021

(65) Prior Publication Data

US 2022/0058487 A1 Feb. 24, 2022

Related U.S. Application Data

(63) Continuation-in-part of application No. PCT/KR2021/001766, filed on Feb. 10, 2021.

(30) Foreign Application Priority Data

May 15, 2020 (KR) ........................ 10-2020-0058669

(51) Int. Cl.
*G06N 3/082* (2023.01)
*G06F 18/40* (2023.01)
*G06V 10/75* (2022.01)

(52) U.S. Cl.
CPC .............. *G06N 3/082* (2013.01); *G06F 18/40* (2023.01); *G06V 10/751* (2022.01)

(58) Field of Classification Search
CPC ....... G06N 3/082; G06V 10/751; G06F 18/40
(Continued)

(56) References Cited

U.S. PATENT DOCUMENTS 5,809,490 A 9/1998 Guiver et al.
8,086,052 B2 12/2011 Toth et al.
(Continued)

FOREIGN PATENT DOCUMENTS

CN 1857001 A 11/2006
CN 103744620 A 4/2014
(Continued)

OTHER PUBLICATIONS

Zhang, et al., "LQ-Nets: Learned Quantization for Highly Accurate and Compact Deep Neural Networks", ECCV2018, 2018 (Year: 2018).*

(Continued)

*Primary Examiner* — Tsu-Chang Lee
(74) *Attorney, Agent, or Firm* — Sughrue Mion, PLLC

(57) ABSTRACT

An electronic apparatus, including a memory configured to store weight data used for computation of a neural network model; and a processor configured to: identify, from among weight values included in the weight data, at least one weight value having a size less than or equal to a threshold value, quantize remaining weight values other than the identified at least one weight value to obtain first quantized data including quantized values corresponding to the remaining weight values, identify, from among the quantized values, a quantized value closest to a predetermined value, obtain second quantized data including a quantized value corresponding to the at least one weight value based on the quantized value closest to the predetermined value, and store the first quantized data and the second quantized data in the memory.

21 Claims, 7 Drawing Sheets

(58) Field of Classification Search
USPC .......................................................... 706/15
See application file for complete search history.

(56) References Cited

U.S. PATENT DOCUMENTS

| | | | |
|---|---|---|---|
| 9,400,955 | B2 | 7/2016 | Garimella |
| 9,916,531 | B1 | 3/2018 | Zivkovic et al. |
| 10,115,393 | B1 * | 10/2018 | Kumar .................... G10L 15/16 |
| 10,410,098 | B2 | 9/2019 | Nealis et al. |
| 10,417,525 | B2 | 9/2019 | Ji et al. |
| 11,074,072 | B2 | 7/2021 | Nealis et al. |
| 11,321,609 | B2 | 5/2022 | Choi et al. |
| 11,593,586 | B2 | 2/2023 | Ji et al. |
| 11,693,658 | B2 | 7/2023 | Nealis et al. |
| 11,875,268 | B2 | 1/2024 | Ji et al. |
| 2006/0251330 | A1 | 11/2006 | Toth et al. |
| 2016/0086078 | A1 | 3/2016 | Ji et al. |
| 2016/0328645 | A1 | 11/2016 | Lin et al. |
| 2016/0328647 | A1 | 11/2016 | Lin et al. |
| 2017/0286830 | A1 | 10/2017 | El-Yaniv et al. |
| 2017/0308789 | A1 | 10/2017 | Langford et al. |
| 2017/0337471 | A1 | 11/2017 | Kadav et al. |
| 2018/0046903 | A1 | 2/2018 | Yao et al. |
| 2018/0082181 | A1 | 3/2018 | Brothers et al. |
| 2018/0107925 | A1 | 4/2018 | Choi et al. |
| 2018/0239992 | A1 | 8/2018 | Chalfin et al. |
| 2018/0300603 | A1 | 10/2018 | Ambardekar et al. |
| 2018/0300614 | A1 | 10/2018 | Ambardekar et al. |
| 2018/0307950 | A1 | 10/2018 | Nealis et al. |
| 2018/0341857 | A1 | 11/2018 | Lee et al. |
| 2019/0042935 | A1 | 2/2019 | Deisher |
| 2019/0042948 | A1 | 2/2019 | Lee et al. |
| 2019/0057308 | A1 | 2/2019 | Cho et al. |
| 2019/0087744 | A1 | 3/2019 | Schiemenz |
| 2019/0332903 | A1 | 10/2019 | Nealis et al. |
| 2019/0347554 | A1 | 11/2019 | Choi et al. |
| 2019/0392253 | A1 | 12/2019 | Ji et al. |
| 2020/0012926 | A1 | 1/2020 | Murata |
| 2020/0082269 | A1 | 3/2020 | Gao et al. |
| 2020/0097818 | A1 | 3/2020 | Li et al. |
| 2020/0143249 | A1 | 5/2020 | Georgiadis |
| 2020/0184318 | A1 | 6/2020 | Minezawa et al. |
| 2020/0293893 | A1 * | 9/2020 | Georgiadis ............. G06N 3/082 |
| 2020/0302292 | A1 | 9/2020 | Tseng et al. |
| 2021/0182077 | A1 * | 6/2021 | Chen .................. G06Q 30/0241 |
| 2021/0232894 | A1 | 7/2021 | Yamada et al. |
| 2021/0373886 | A1 | 12/2021 | Nealis et al. |
| 2023/0140474 | A1 | 5/2023 | Ji et al. |
| 2023/0359461 | A1 | 11/2023 | Nealis et al. |

FOREIGN PATENT DOCUMENTS

| | | | |
|---|---|---|---|
| CN | 105447498 | A | 3/2016 |
| CN | 106203624 | A | 12/2016 |
| CN | 107967515 | A | 4/2018 |
| CN | 108734285 | A | 11/2018 |
| CN | 107103113 | B | 1/2019 |
| JP | 2019032729 | A | 2/2019 |
| JP | 2020009048 | A | 1/2020 |
| KR | 100248072 | B1 | 3/2000 |
| KR | 1020060027795 | A | 3/2006 |
| KR | 10-0662516 | B1 | 12/2006 |
| KR | 100790900 | B1 | 1/2008 |
| KR | 1020160034814 | A | 3/2016 |
| KR | 1020180013674 | A | 2/2018 |
| KR | 1020180043154 | A | 4/2018 |
| KR | 1020180120967 | A1 | 11/2018 |
| KR | 1020190054449 | A | 5/2019 |
| KR | 1020190093932 | A | 8/2019 |
| KR | 10-2019-0130443 | A | 11/2019 |
| KR | 10-2019-0130455 | A | 11/2019 |
| KR | 1020200049422 | A | 5/2020 |
| KR | 1020200052200 | A | 5/2020 |
| WO | 2016/173488 | A1 | 11/2016 |
| WO | 2017049496 | A1 | 3/2017 |
| WO | 2019008752 | A1 | 1/2019 |
| WO | 2019088657 | A1 | 5/2019 |
| WO | 2020/075433 | A1 | 4/2020 |

OTHER PUBLICATIONS

Hubara, et al., "Quantized neural networks: training neural networks with low precision weights and activations", Journal of Machine Learning Research 18 (2018) 1-30, 2018 (Year: 2018).*

Nagel, et al., "A white paper on neural network quantization", arXiv:2016.08295v1 [cs. LG] Jun. 15, 2021 (Year: 2021).*

Communication issued Feb. 26, 2024 by the European Patent Office for EP Patent Application No. 20819392.0.

Office Action issued on Mar. 30, 2024 by the Chinese Patent Office in corresponding CN Patent Application No. 202010493206.8.

Notice Of Allowance issued Apr. 26, 2024 issued by the Chinese Patent Office in corresponding CN Patent Application No. 201980025238.0.

Office Action issued on May 9, 2024 by the U.S. Patent Office in corresponding U.S. Appl. No. 17/044,104.

Hsiao, Yu-Shun, Yun-Chen Lo, and Ren-Shuo Liu. "FlexNet: Neural networks with inherent inference-time bitwidth flexibility", In Proceedings of International Symposium on Microarchitecture, 2018, 2 pages.

Wang, Kuan, Zhijian Liu, Yujun Lin, Ji Lin, and Song Han. "Haq: Hardware-aware automated quantization with mixed precision", In Proceedings of the IEEE/CVF conference on computer vision and pattern recognition, pp. 8612-8620, Apr. 6, 2019, arXiv:1811. 08886v3 [cs.CV].

Guo, Yiwen, Anbang Yao, Hao Zhao, and Yurong Chen. "Network sketching: Exploiting binary structure in deep cnns", In Proceedings of the IEEE Conference on Computer Vision and Pattern Recognition, pp. 5955-5963, Jun. 7, 2017, arXiv:1706.02021v1 [cs.NE].

Office Action issued on May 14, 2024 by the Korean Patent Office in corresponding KR Patent Application No. 10-2019-0066396.

Communication dated May 27, 2022, issued by the European Patent Office in counterpart European Application No. 20819392.0.

Yang et al., "Deploy Large-Scale Deep Neural Networks in Resource Constrained IoT Devices with Local Quantization Region," arxiv. org, Cornell University Library, May 24, 2018, XP081234517, Total 8 pages.

Communication dated Jun. 22, 2022, issued by the United States Patent and Trademark Office in U.S. Appl. No. 16/876,688.

Office Action issued Jan. 23, 2023 by the United States Patent and Trademark Office in counterpart U.S. Appl. No. 16/876,688.

International Search Report (PCT/ISA/210) dated May 28, 2021 issued by the International Searching Authority in International Application No. PCT/KR2021/001766.

Written Opinion (PCT/ISA/237) dated May 28, 2021 issued by the International Searching Authority in International Application No. PCT/KR2021/001766.

International Search Report (PCT/ISA/210) and Written Opinion (PCT/ISA/237) dated Apr. 18, 2019 issued by the International Searching Authority in International Application No. PCT/KR2019/ 000142.

International Search Report (PCT/ISA/210) and Written Opinion (PCT/ISA/237) dated Aug. 14, 2020 issued by the International Searching Authority in International Application No. PCT/KR2020/ 006411.

Communication dated Jun. 24, 2021 issued by the European Patent Office in application No. 19800295.8.

Zhou, S., et al., "IQNN: Training Quantized Neural Networks with Iterative Optimizations", International Conference on Image Analysis and Processing, 17th International Conference, Sep. 9-13, 2013, pp. 688-695, XP047451810.

Ji, Z., et al., "Reducing Weight Precision of Convolutional Neural Networks towards Large-scale On-chip Image Recognition", Proceedings of SPIE, IEEE, vol. 9496, May 20, 2015, 9 pages, XP060055095.

Pilipović, R., et al., "Compression of convolutional neural networks", 17th International Symposium INFOTEH-JAHORINA, Mar. 21-23, 2018, 6 pages, XP033335103.

(56) References Cited

OTHER PUBLICATIONS

Li, H., et al., "Towards a Deeper Understanding of Training Quantized Neural Networks", Aug. 1, 2017, 9 pages, XP055590849.

Park, E., et al., "Weighted-Entropy-based Quantization for Deep Neural Networks", 2017 IEEE Conference on Computer Vision and Pattern Recognition, pp. 7197-7205.

Dong, Y., et al., "Learning Accurate Low-Bit Deep Neural Networks with Stochastic Quantization", arXiv:1708.01001v1 [cs.CV], Aug. 3, 2017, pp. 1-12.

Xu, C., et al., "Alternating Multi-Bit Quantization for Recurrent Neural Networks", arXiv:1802.00150v1 [cs.LG], Feb. 1, 2018, pp. 1-13.

Zhu, C., et al., "Trained Ternary Quantization", arXiv:1612.01064v3 [cs.LG], ICLR, Feb. 23, 2017, pp. 1-10.

Courbariaux, M., et al., "BinaryConnect: Training Deep Neural Networks with binary weights during propagations", https://github.com/MatthieuCourbariaux/BinaryConnect, pp. 1-9.

Office Action issued Oct. 19, 2024 by the Chinese Patent Office for Chinese Patent Application No. 202010493206.8.

Office Action issued Dec. 6, 2024 by the Korean Patent Office for Korean Patent Application No. 10-2020-0058669.

Office Action issued Jan. 10, 2025 for U.S. Appl. No. 17/044,104.

Office Action, issuance date: Oct. 19, 2022, issued for U.S. Appl. No. 16/876,688.

Communication dated Nov. 24, 2023, issued by the Korean Intellectual Property Office in counterpart Korean Application No. 10-2018-0053185.

Communication dated Dec. 26, 2023, issued by the National Intellectual Property Administration, PRC in counterpart Chinese Application No. 201980025238.0.

Communication dated Feb. 12, 2024, issued by the European Patent Office in counterpart European Application No. 19800295.8.

Office Action dated Feb. 8, 2024, issued by the United States Patent and Trademark Office in counterpart U.S. Appl. No. 17/044,104.

Communication dated Jan. 16, 2025 issued by the China National Intellectual Property Administration in Chinese Patent Application No. 202010493206.8.

Communication dated Jan. 31, 2025 issued by the European Patent Office in European Patent Application No. 19800295.8.

Communication issued on Jun. 25, 2025 from the European Patent Office for European Patent Application No. 19800295.8.

Communication issued on Apr. 10, 2025 from the China National Intellectual Property Administration for Chinese Patent Application No. 202010493206.8.

Communication issued on Jun. 16, 2025 from the European Patent Office for European Patent Application No. 19800295.8.

Communication issued Oct. 6, 2025 by the European Patent Office in European Patent Application No. 20819392.0.

* cited by examiner

230 —
$$w1 \approx \min (\pm a2 \pm a3 \pm a4)$$
$$W \approx [\min (\pm a2 \pm a3 \pm a4), a2 \cdot b22 + a3 \cdot b32 + a4 \cdot b42, a2 \cdot b23$$
$$+ a3 \cdot b33 + a4 \cdot b43, a2 \cdot b24 + a3 \cdot b34 + a4 \cdot b44]$$

240 —
$$w1 \approx \min (\pm a2 \pm a3 \pm a4)$$
$$w2 \approx a2 \cdot b22 + a3 \cdot b32 + a4 \cdot b42$$
$$w3 \approx a2 \cdot b23 + a3 \cdot b33 + a4 \cdot b43$$
$$w4 \approx a2 \cdot b24 + a3 \cdot b34 + a4 \cdot b44$$

W → [w1/w(max), w2/w(max), w3/w(max), w4/w(max)]

m1= |w1| / |w(max)|
m2= |w2| / |w(max)|
m3= |w3| / |w(max)|
m4= |w4| / |w(max)|

Scaling factor=(m1*w1+m2*w2+m3*w3+m4*w4)/(m1+m2+m3+m4)
```

W → [f1/f(max), f2/f(max), f3/f(max), f4/f(max)]

m1= |f1| / |f(max)|
m2= |f2| / |f(max)|
m3= |f3| / |f(max)|
m4= |f4| / |f(max)|

Scaling factor=(m1*f1+m2*f2+m3*f3+m4*f4)/(m1+m2+m3+m4)
```

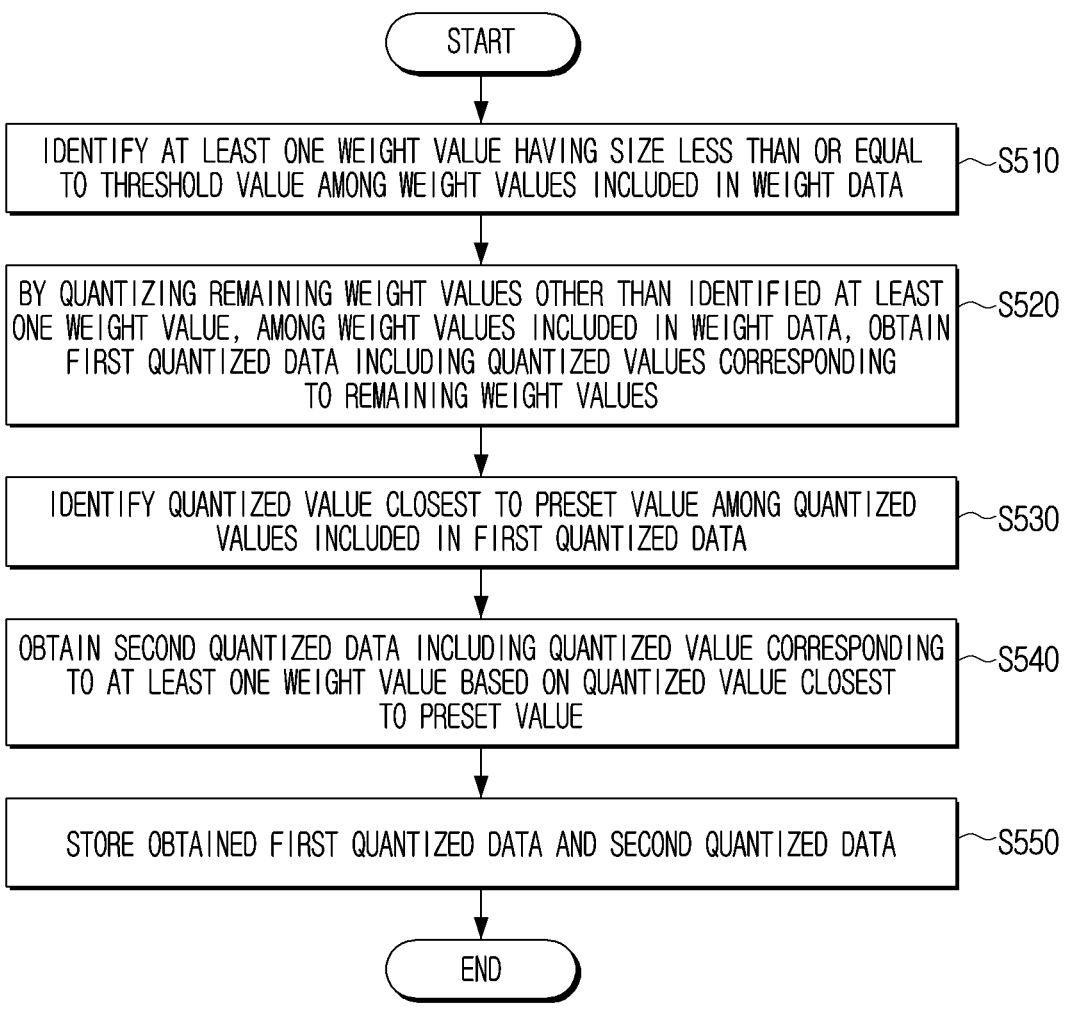

START

IDENTIFY AT LEAST ONE WEIGHT VALUE HAVING SIZE LESS THAN OR EQUAL
TO THRESHOLD VALUE AMONG WEIGHT VALUES INCLUDED IN WEIGHT DATA ~S510

BY QUANTIZING REMAINING WEIGHT VALUES OTHER THAN IDENTIFIED AT LEAST
ONE WEIGHT VALUE, AMONG WEIGHT VALUES INCLUDED IN WEIGHT DATA, OBTAIN ~S520
FIRST QUANTIZED DATA INCLUDING QUANTIZED VALUES CORRESPONDING
TO REMAINING WEIGHT VALUES

IDENTIFY QUANTIZED VALUE CLOSEST TO PRESET VALUE AMONG QUANTIZED
VALUES INCLUDED IN FIRST QUANTIZED DATA ~S530

OBTAIN SECOND QUANTIZED DATA INCLUDING QUANTIZED VALUE CORRESPONDING
TO AT LEAST ONE WEIGHT VALUE BASED ON QUANTIZED VALUE CLOSEST ~S540
TO PRESET VALUE

STORE OBTAINED FIRST QUANTIZED DATA AND SECOND QUANTIZED DATA ~S550

END

ELECTRONIC APPARATUS AND METHOD FOR CONTROLLING THEREOF

CROSS-REFERENCE TO RELATED APPLICATION(S)

This application is a bypass continuation of International Application No. PCT/KR2021/001766, filed on Feb. 10, 2021, which is based on and claims priority to Korean Patent Application No. 10-2020-0058669, filed on May 15, 2020, in the Korean Intellectual Property Office, the disclosures of which are incorporated by reference herein in their entireties.

BACKGROUND

1. Field

The disclosure relates to an electronic apparatus and a method for controlling thereof and, more particularly to, an electronic apparatus which operates based on artificial intelligence (AI) technology and a method for controlling thereof.

2. Description of Related Art

AI systems that implement human-level intelligence has been developed. An AI system may be a system in which a machine learns and infers based on a neural network model, unlike existing rule-based systems, and may be used in various fields such as speech recognition, image recognition and future prediction.

In recent years, AI systems have been developed that solve a given problem through a deep neural network based on deep learning.

A deep neural network may be a neural network that includes multiple hidden layers between an input layer and an output layer. It may be a model that implements artificial intelligence technology through weights included in each layer.

Generally, a deep neural network includes a plurality of weights in order to deduce an accurate result value.

Accuracy of the output data may be improved using by a large amount of weight values, but doing so may present a capacity problem if a deep neural network is attempted to be used in a mobile device such as a smartphone with limited memory.

SUMMARY

Provided are an electronic apparatus for reducing a weight of a neural network model and a method for controlling thereof.

In accordance with an aspect of the disclosure, an electronic apparatus includes a memory configured to store weight data used for computation of a neural network model; and a processor configured to: identify, from among weight values included in the weight data, at least one weight value having a size less than or equal to a threshold value, quantize remaining weight values other than the identified at least one weight value to obtain first quantized data including quantized values corresponding to the remaining weight values, identify, from among the quantized values, a quantized value closest to a predetermined value, obtain second quantized data including a quantized value corresponding to the at least one weight value based on the quantized value closest to the predetermined value, and store the first quantized data and the second quantized data in the memory.

The processor may be further configured to identify the quantized value closest to the predetermined value as the quantized value corresponding to the at least one weight value.

The processor may be further configured to: based on the quantization of the remaining weight values, obtain the first quantized data including a plurality of scaling factors and bit values corresponding to the remaining weight values, obtain a plurality of computational values based on computation using the plurality of scaling factors, identify, from among the plurality of computational values, a computational value closest to the predetermined value, and obtain the second quantized data based on the identified computational value.

The processor may be further configured to identify the computational value closest to the predetermined value as the quantized value corresponding to the at least one weight value.

The processor may be further configured to: obtain the plurality of computational values by adding values obtained by multiplying each of the plurality of scaling factors by +1 or −1, and identify the computational value closest to the predetermined value among the plurality of computational values.

The processor may be further configured to: identify a first plurality of computations which output the computational value closest to the predetermined value among a second plurality of computations using the plurality of scaling factors, identify, from among the first plurality of computations, a computation which outputs a computational value having a same code as a code of the at least one weight value, and obtain the second quantized data based on the identified computation.

The processor may be further configured to: identify codes of the plurality of scaling factors included in a computation, among a plurality of computations using the plurality of scaling factors, to output the computational value closest to the predetermined value, and obtain the second quantized data based on the codes.

The processor may be further configured to: receive a user input to set a pruning rate, and identify the at least one weight value based on sizes of the weight values.

The predetermined value may be zero.

In accordance with an aspect of the disclosure, a method for controlling an electronic apparatus includes identifying, from among weight values included in weight data, at least one weight value having a size less than or equal to a threshold value; quantizing remaining weight values other than the identified at least one weight value to obtain first quantized data including quantized values corresponding to the remaining weight values; identifying, from among the quantized values, a quantized value closest to a predetermined value; obtaining second quantized data including a quantized value corresponding to the at least one weight value based on the quantized value closest to the predetermined value; and storing the first quantized data and the second quantized data.

The obtaining the second quantized data may include identifying the quantized value closest to the predetermined value as the quantized value corresponding to the at least one weight value.

The obtaining the first quantized data may include, based on the quantization of the remaining weight values, obtaining the first quantized data including a plurality of scaling factors and bit values corresponding to the remaining weight values, and the obtaining the second quantized data may include: obtaining a plurality of computational values based on computation using the plurality of scaling factors; identifying, from among the plurality of computational values, a computational value closest to the predetermined value; and obtaining the second quantized data based on the identified computational value.

The obtaining the second quantized data may include identifying the computational value closest to the predetermined value as the quantized value corresponding to the at least one weight value.

The identifying the computational value may include: obtaining the plurality of computational values by adding values obtained by multiplying each of the plurality of scaling factors by +1 or −1; and identifying the computational value closest to the predetermined value among the plurality of computational values.

The obtaining the second quantized data may include: identifying a first plurality of computations which output the computational value closest to the predetermined value among a second plurality of computations using the plurality of scaling factors; identifying, from among the first plurality of computations, a computation which outputs a computational value having a same code as a code of the at least one weight value; and obtaining the second quantized data based on the identified computation.

In accordance with an aspect of the disclosure, a method for controlling an electronic apparatus includes obtaining a weight values included in weight data of a neural network model; selecting, from among the weight values, a first weight value to be pruned from the weight values; quantizing remaining weight values other than the first weight value to obtain quantized weight values corresponding to the remaining weight values; identifying, from among the quantized weight values, a smallest quantized weight value; based on the smallest quantized weight value, determining a first quantized weight value corresponding to the first weight value; storing the quantized weight values and the first quantized weight value; and performing a computation using a quantized neural network model obtained based on the quantized weight values and the first quantized weight value.

The smallest quantized weight value may be determined as the first quantized weight value.

The first weight value may be selected based on a result of a comparison between the first weight value and a threshold value.

The threshold value may be set based on a user input.

The threshold value may be determined based on a pruning rate set based on the user input.

As described above, according to various embodiments, an AI technology with high output accuracy may be implemented even in a mobile device, or the like, having a limited memory.

BRIEF DESCRIPTION OF THE DRAWINGS

FIG. 2A is a diagram illustrating a quantization method according to an embodiment;

FIG. 2B is a diagram illustrating a quantization method according to an embodiment;

FIG. 3A is a diagram illustrating an embodiment of quantizing weight data based on importance according to an embodiment;

FIG. 3B is a diagram illustrating an embodiment of quantizing weight data based on importance according to an embodiment;

FIG. 5 is a flowchart illustrating a method of controlling an electronic apparatus according to an embodiment.

DETAILED DESCRIPTION

Figure 1:
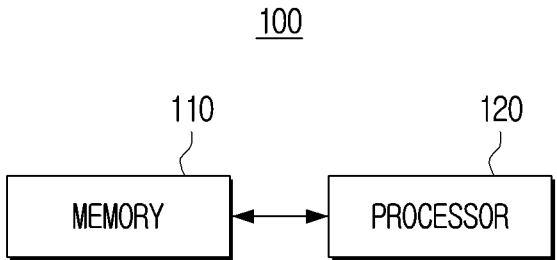
FIG. 1 is a block diagram illustrating an electronic apparatus according to an embodiment.

Hereinafter, various embodiments of the disclosure will be described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature, for example elements such as a numerical value, a function, an operation, or a part, and do not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In the description, the terms "first," "second," and so forth are used to describe diverse elements regardless of their order and/or importance, and to discriminate one element from other elements, but are not limited to the corresponding elements.

It is to be understood that an element, for example a first element, that is "operatively or communicatively coupled with/to" another element, for example a second element, may be directly connected to the other element or may be connected via another element, for example a third element. In embodiments, based on an element, for example a first element, being "directly connected" or "directly accessed" to another element, for example a second element, it may be understood that there is no other element, for example a third element, between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor, for example an embedded processor, to perform the corresponding action, or a generic-purpose processor, for example a central processing unit (CPU) or application processor (AP), that can perform the corresponding actions by executing one or more software programs stored in the memory device.

Hereinbelow, embodiments will be described in greater detail with reference to the drawings attached hereto.

FIG. 1 is a block diagram illustrating an electronic apparatus according to an embodiment.

Referring to FIG. 1, an electronic apparatus 100 according to an embodiment includes a memory 110 and a processor 120.

The electronic apparatus 100 is a device to obtain output data relative to input data using a neural network model or training, compressing of a neural network model, or for example an artificial intelligence model. For example, the electronic apparatus 100 may be a desktop personal computer (PC), a notebook, a smart phone, a tablet PC, a server, and the like. In embodiments, the electronic apparatus 100 may be the system itself in which the cloud computing environment is built. However, the disclosure is not limited thereto, and the electronic apparatus 100 may be any device as long as the device may be operated and compressed using an artificial intelligence model.

The memory 110 may be implemented as a non-volatile memory, a volatile memory, or the like. The non-volatile memory may be one time programmable ROM (OTPROM), programmable ROM (PROM), erasable and programmable ROM (EPROM), electrically erasable and programmable ROM (EEPROM), mask ROM, flash ROM, or the like, and the volatile memory may be a dynamic random access memory (DRAM), a static random access memory (SRAM), a synchronous dynamic random access memory (SDRAM), or the like.

FIG. 1 illustrates that the memory 110 is a configuration separate from the processor 120, but the memory 110 may be included in the processor 120. The memory 110 may be implemented as an off-chip memory, or an on-chip memory. FIG. 1 illustrates one memory 110, but the memory 110 may be implemented in plural according to an embodiment.

The memory 110 may store the weight data of the neural network model. The weight data is data used for the computation of the neural network model, and the memory 110 may store a plurality of weight data corresponding to a plurality of layers forming the neural network model. The weight data may include weight values. A weight value may be represented as a floating-point of n bits, and for example, the weight data may include weight values represented as floating-points of 32 bits. The weight data may be represented as at least one of a vector, a matrix, or a tensor.

The memory 110 may store quantized data including quantized weight values. Here, a quantized weight value may be represented as a fixed-point of k bits, and for example, the quantized weight value may be represented as a fixed-point of 4 bits. In addition, k may be an integer greater than or equal to 1, and may be less than n described above.

The memory 110 may store quantized data including weight values quantized into a binary code. In this example, the quantized data may include a scaling factor and bit values of −1 or 1.

In embodiments, the bit value −1 described above may be substituted with 0 and stored in the memory 110. The memory 110 may store quantized data including a scaling factor and bit values of 0 or 1.

The quantized data may be represented as at least one of a vector, a matrix, or a tensor according to a format of the weight data.

Quantization of the neural network model may be performed by the processor 120 of the electronic apparatus 100. However, the embodiment is not limited thereto and the quantization of the neural network model may be performed by an external device, for example a server. Based on quantization of the neural network model being performed by the external device, the processor 120 may receive quantized data including quantized weight values from an external device and store the quantized data in the memory 110.

The neural network model may be based on a neural network. For example, the neural network model may be a Recurrent Neural Network (RNN)-based model. Here, RNN means a cyclic neural network, and may be a type of deep learning model for learning data that changes over time, such as time series data.

The embodiment is not limited thereto and the neural network model may be a model based on various networks such as convolutional neural network (CNN), deep neural network (DNN), restricted Boltzmann machine (RBM), deep belief network (DBM), or bidirectional recurrent deep neural network (BRDNN). In embodiments, the memory 110 may store a model generated based on a rule rather than a model trained through an AI algorithm, and there is no particular limitation on the model stored in the memory 110.

The processor 120 may generally control the operation of the electronic apparatus 100. The processor 120 may include one or a plurality of processors. Here, one or a plurality of processors may be a general-purpose processor such as a central processing unit (CPU), but may be an artificial intelligence-only processor such as a graphics processing unit (GPU) or a neural network processing unit (NPU). In addition, the processor 120 may be a system-on-chip (SoC), an on-device artificial intelligence chip, a large scale integration (LSI), or a field programmable gate array (FPGA).

The processor 120 may quantize the weight values of the neural network model based on the quantization algorithm. Here, the quantization algorithm may be an algorithm for lightening, or for example reducing, the size of weight values included in the neural network model, and the processor 120 may quantize the weight values stored in the memory 110 into quantized values having a predetermined number of bits based on a quantization algorithm. For example, based on the weight values being floating-point format of 32 bits, the processor 120 may quantize the weight values into a 4-bit fixed-point format. In embodiments, the processor 120 may quantize the weight values represented by the 32-bit floating-point to values of −1 or 1 based on a quantization algorithm based on the binary code.

There is no particular limitation on how to quantize the weight value in the disclosure. For example, quantization may be performed through various algorithms, such as unitary quantization, adaptive quantization, uniform quantization, supervised iterative quantization, or binary code quantization.

For example, as for the quantization of binary code scheme, when the processor 120 quantizes the weight values to k bits, the processor 120 may quantize the weight values of the neural network model through various quantization algorithms satisfying Equation 1.

$$\min_{\{a_i,b_i\}_{i=1}^{k}} \left\| w - \sum_{i=1}^{k} \alpha_i b_i \right\|^2 \qquad \text{[Equation 1]}$$

In equation 1, w refers to a weight value before quantization, a refers to a scaling factor, and b refers to a quantized weight value which may be −1 or 1.

For example, the processor 120 may quantize the weight values through a greedy algorithm. In this example, the processor 120 may obtain the scaling factor and the quantized weight value based on k=1 in Equation 1 above, according to Equation 2.

$$b^* = \text{sign}(w), \qquad \text{[Equation 2]}$$

-continued $$a^* = \frac{w^T b^*}{n}$$

In equation 2, w refers to a weight value before quantization, a* refers to a scaling factor based on k=1, b* refers to a quantized weight value based on k=1, which is −1 or 1, n may be an integer greater than or equal to 1.

The processor 120 may obtain the scaling factor and the quantized weight value based on k=i (1<i≤k) by iteratively calculating Equation 3. The processor 120 may obtain a scaling factor and a quantized weight value based on k=2 by using r, which is a difference between a weight value before quantization and a weight value quantized based on k=1, and may obtain a scaling factor and a quantized weight value based on k=i (1<i≤k) in a similar manner.

$$\min_{\alpha_i, b_i} \| r_{i-1} - \alpha_i b_i \|^2, \qquad \text{[Equation 3]}$$

$$\text{where } r_{i-1} = w - \sum_{j=1}^{i-1} \alpha_j b_j, \ 1 < i \le k$$

In equation 3, w refers to a weight value before quantization, a refers to a scaling factor, b is a quantized weight value which may be −1 or 1, and r may be a difference between the weight value before quantization and a quantized weight value.

The processor 120 may exclude at least one weight value having a size less than or equal to a threshold value among the weight values stored in the memory 110 and may perform quantization based on the remaining weight values. An example of this will be described later with reference to FIGS. 2A and 2B.

The processor 120 may obtain output data for the input data based on the quantized weight values of the neural network model. Here, the input data may be text, image, user voice, or the like. As an example, the text may be text input through an input interface, such as a keyboard or touchpad of the electronic apparatus 100, and the image may be an image captured through a camera of the electronic apparatus 100. The user voice may be the user voice input to the microphone of the electronic apparatus 100.

The output data may be different depending on the type of input data and/or neural network model. The output data may be different depending on which input data is input to which neural network model. For example, based on the neural network model of the disclosure being a model for language translation, the processor 120 may obtain output data represented in a second language based on input data represented in a first language. In embodiments, based on the neural network model of the disclosure being a model for image analysis, the processor 120 may input the image as input data of the neural network model, and obtain information about an object detected in the corresponding image as output data. Based on the neural network model of the disclosure being a model for speech recognition, the processor 120 may input the user voice as input data and obtain text corresponding to the user voice as output data. The input data and the output data of the disclosure are exemplary and embodiments are not limited thereto.

The processor 120 may represent input data as a vector including a plurality of input values based on the input data being input. According to an embodiment, the input values may be represented by a matrix or a tensor. Here, a method of representing input data as a vector may be different depending on a type or a form of input data. For example, based on a text, or a user voice-converted text, being inputted as the input data, the processor 120 may represent the text as a vector through one hot encoding, or may represent the text as a vector through a word embedding. For example, for a word embedding method, Word2Vec, Fast-Text, Glove, or the like, may be used. Based on the image being input as the input data, the processor 120 may represent each pixel of the image as a matrix. The processor 120 may represent each pixel of the image as a value of 0 to 255 for each RGB color, or may normalize the value represented as 0 to 255 as a preset value, for example 255, and may represent as matrix. In embodiments, a preset value may mean a predetermined value.

The processor 120 may perform computation of the neural network model based on the quantized data and the input data. Here, the computation may be deep learning computation in the form of y=Qw*x (where Qw may be the quantized data, x may be the input data, and y may be output data). The processor 120 may further include a processing element (PE) that performs the computation of the data. The computation of the artificial neural network may be performed according to any known methods, as desired.

The processor 120 may perform quantization based on weight values having a high importance, among the weight values stored in the memory 110. It is considered that the weight value having a low importance, for example a small-size weight value, may have no or weak influence over output data, and accordingly, the disclosure may reduce the amount of the weight data while outputting high accuracy output data. Hereinafter, a method of performing quantization in consideration of importance of a weight will be described in detail.

FIGS. 2A and 2B are diagrams illustrating a quantization method according to an embodiment of the disclosure. Hereinafter, a method of quantizing one weight data in a vector form will be described for convenience of description, but it is to be understood that the technical idea of the disclosure may be applied to quantize weight data in a matrix or tensor form and to quantize a plurality of weight data corresponding to a plurality of layers.

For convenience, it will be described that the weight data W is [w1, w2, w3, w4], but the weight data W may include weight values of n (where n is an integer greater than or equal to 1), and the weight data including n weight values may be applied with the technical idea of the disclosure.

The processor 120 may quantize the weight data stored in the memory 110. Specifically, the processor 120 may load the weight data to be quantized from the memory 110 and quantize the weight values included in the loaded weight data.

For example, as described above, based on the weight data W being stored in the memory 110 being [w1, w2, w3, w4] and the weight data W being quantized to k bit, the processor 120 may quantize the floating-point format of n bit [w1, w2, w3, w4] to fixed-point format [w1', w2', w3', w4'] of k bit.

Based on the weight data W being quantized to k bit based on binary code-based algorithm, the processor 120 may, based on Equations 2 and 3 above, quantize the weight data W to a1[b11, b12, b13, b14]+a2[b21, b22, b23, b24]+a3 [b31, b32, b33, b34]+a4[b41, b42, b43, b44]+ . . . +ak[bk1, bk2, bk3, bk4]. For example, based on the weight data W being quantized to 4 bits, the processor 120 may quantize the weight data W to a1[b11, b12, b13, b14]+a2[b21, b22, b23, b24]+a3[b31, b32, b33, b34]+a4[b41, b42, b43, b44] as shown in reference numeral 210 of FIG. 2A.

The quantization method is performed under the condition to minimize a mean square error of all weight values before quantization.

In fact, however, some weight values, among the weight values, may have less impact on the accuracy of the output data. For example, even though the weight value having a size close to 0 is excluded, or pruned, the influence over accuracy of the output data is little or less. In consideration of this point, quantization of the weight data may be performed based on the remaining weight values, except some weight values having no or less influence over the accuracy of the output data. Accordingly, based on being compared with the above-described quantization method, the weight data may be quantized to fewer bits without significantly losing the accuracy of the output data. That is, the neural network model may be efficiently lightened.

The processor 120 may identify at least one weight value having a size less than or equal to a threshold value among weight values included in the weight data. Specifically, the processor 120 may load the weight data from the memory 110, identify the size of each of the weight values included in the weight data, and identify at least one weight value having a size less than or equal to a threshold value among the weight values.

For example, based on the weight data W being [w1, w2, w3, w4], the processor 120 may identify the size of each of the weight values w1, w2, w3, w4, and identify at least one weight value having a size less than or equal to a threshold value among the weight values w1, w2, w3, w4.

The threshold value may be set based on user input for setting the threshold value. For example, based on the threshold value being set to 0.3 according to the user input, the processor 120 may identify a weight value having a size smaller than 0.3, among the weight values included in the weight data, for example, a weight value of 0.2 or –0.1 as the at least one weight value as described above. In embodiments, the size of the weight value being smaller than the threshold value may mean that the absolute value of the weight value is smaller than the threshold value.

In addition, the at least one weight value described above may be identified based on a user input for pruning rate setting. Specifically, based on a user input for setting a pruning rate being received, the processor 120 may identify weight values belonging to a pruning rate among weight values included in the weight data based on the size of the weight values. For example, based on the pruning rate being set to 25%, the processor 120 may identify at least one weight value having a weight value of bottom 25% among the weight values included in the weight data.

It has been described that the threshold value is set based on the user input for setting the threshold value, but the threshold value may be set based on the user input for the pruning rate setting. Specifically, the processor 120 may identify weight values belonging to a pruning rate among weight values included in the weight data based on the size of the weight values, and set the size of the weight value having the largest size among the weight values belonging to the pruning rate to a threshold value.

The threshold value described above may be set based on an automated machine learning (AutoML) technology, such as Bayesian optimization, according to an embodiment. The Bayesian optimization may be a technology for searching for or determining an optimal value of hyperparameter to implement the accuracy of the neural network model at a high level, and the Bayesian optimization may search the optimal value of the hyperparameter through various target functions that identify the accuracy of the output value of the neural network model with the hyperparameter as the input value. Specifically, embodiments may apply a plurality of candidate threshold values obtained through sampling as a hyperparameter to a target function of Bayesian optimization, and may set a candidate threshold value input as an input value as a threshold value for the quantization based on the highest Bayesian optimization output value being output. In this example, various functions that may identify the accuracy of the output value of the neural network model may be applied by using the candidate threshold value as an input value. As such, the disclosure may obtain a high accuracy lightweight neural network model that does not need to be retrained based on the quantized weight values after quantization, by setting the threshold value using a statistical technology such as Bayesian optimization. The setting of the threshold value may be performed by the processor 120, but embodiments are not limited thereto, and the setting may be performed by a separate external device.

Based on at least one weight value having a size less than or equal to a threshold value being identified, the processor 120 may perform quantization on the basis of the weight values excluding the at least one weight value, among the weight values included in the weight data. The processor 120 may prune some weight values and quantize the remaining weight values that are not pruned.

Hereinafter, for convenience, quantized data obtained by quantization of the remaining weight values, excluding at least one weight value having a size less than or equal to a threshold value, may be referred to as first quantized data, and quantized data obtained by quantization of at least one weight value having a size less than or equal to a threshold value may be referred to as second quantized data.

For example, based on the weight value having a size less than or equal to the threshold value being w1, among the weight values w1, w2, w3, w4 included in the weight data W, the processor 120 may perform quantization for [w2, w3, w4] excluding w1. The quantization method may be applied with various algorithms that may floating-point format of n bit to fixed-point format of k bit, as described above.

The processor 120 may obtain the first quantized data by quantizing [w2, w3, w4]. The processor 120 may obtain [w2', w3', w4'] which may be the fixed-point format of k bit, by quantizing [w2, w3, w4], which may be the floating-point format of n bit, to k bit.

The processor 120, by quantizing [w2, w3, w4] to the binary code, may obtain first quantized data including a plurality of scaling factor, or bit values of –1 or 1. For example, referring to reference numeral 220 of FIG. 2A, the processor 120 may quantize W=[w2, w3, w4], based on the quantization algorithm, to W' which is a2[b22, b23, b24]+a3[b32, b33, b34]+a4[b42, b43, b44], to obtain first quantized data including a plurality of scaling factors a2, a3, a4, orbit values of –1 or 1. Based on b22=1, b32=–1, b42=–1, b23=1, b33=1, b43=–1, b24=1, b34=1, b44=–1, the processor 120 may obtain a plurality of scaling factors a2, a3, a4, bit values [1, –1, –1] corresponding to w2, bit values [1, 1, –1] corresponding to w3, and bit values [1, 1, –1] corresponding to w4 as the first quantized data and may store the same in the memory 110.

The processor may substitute the bit value –1 to 0, and may store binary data "100" corresponding to w2, binary data "110" corresponding to w3, and binary data "110" corresponding to w4 in the memory 110.

The processor 120 may obtain quantized data, which may be for example second quantized data, including a quantized value corresponding to at least one weight value as described above.

The processor 120 may identify a quantized value closest to a preset value among the quantized values included in the first quantized data as a quantized value corresponding to the at least one weight value described above. The preset value may be 0.

The processor 120 may identify the size of each of the quantized values included in the first quantized data and may identify the quantized value having the smallest size, among the quantized values included in the first quantized data. For example, as described above, based on first quantized data such as [w2', w3', w4'] being obtained by quantizing remaining weight values [w2, w3, w4] other than the weight value w 1 having a size less than or equal to a threshold value, the processor 120 may identify the sizes of each of w2', w3', and w4', and may identify the quantized value w1' with the minimum size as the quantized value w1' of w1, among w2', w3', and w4'.

There may be two quantized values as quantized values closest to 0 according to an embodiment, such as the case where the size of w2', w3', and w4' as described above is w2'>w3'=w4', and the codes of w3' and w4' are different.

In this example, the processor 120 may determine one of the two quantized values as a quantized value of w1 based on the size, or code, of the weight value w1 prior to quantization. Based on the size of the weight value w1 being greater than 0, or for example the code being positive, the processor 120 may determine a quantized value having a positive value as a quantized value of w1, and based on the value of the weight value w1 being less than zero, or for example based on the code being negative, may determine a quantized value having a negative value as a quantized value of w1. However, according to an embodiment, any one of the two quantized values may be randomly selected according to an embodiment.

The processor 120 may store the obtained first quantized data and the second quantized data in the memory 110. In the embodiment described above, the processor 120 may store [w1', w2', w3', w4'] in the memory 110. The stored quantized data may then be used in the computation of the neural network model or transmitted to an external device capable of performing the computation of the neural network model.

Based on the weight data being quantized based on the binary code, the processor 120 may obtain the quantized data, which may be for example the second quantized data, corresponding to the at least one weight value based on the plurality of obtained scaling factors.

The processor 120 may obtain a plurality of computational values based on computation using a plurality of scaling factors, and obtain the second quantized data based on the computational value closest to the preset value among the plurality of computational values. The preset value may be 0.

The processor 120 may perform a plurality of computations using a plurality of scaling factors. The processor 120 may perform computation of adding a value obtained by multiplying each of the plurality of scaling factors by +1 or −1.

For example, as described above, based on a plurality of scaling factors a2, a3, and a4 being obtained by quantizing remaining weight values [w2, w3, w4] except w1 having a size less than or equal to a threshold value, the processor 120 may perform computation of +a2+a3+a4.

The processor 120 may identify the computational value closest to 0 among a plurality of computational values obtained using a plurality of scaling factors.

The processor 120 may obtain two values as a computational value closest to zero. For example, based on the size of the scaling factor described above being a2>a3>a4, the processor 120 may determine the computational value k obtained based on the a2−a3−Aa computation and the computational value −k obtained based on −(a2−a3−a4) as a computational value closest to 0.

In this example, the processor 120 may identify one of the two computational values as a computational value for obtaining the second quantized data based on the size, or code, of the weight value w1 before the quantization. Specifically, based on the size of the weight value w1 being greater than 0, or for example based on the code being positive, the processor 120 may identify the computational value k having a positive value as a computational value for obtaining the second quantized data, and based on the value of the weight value w1 being less than zero, or for example based on the code being negative, the processor 120 may identify the computational value −k having a negative value as a computational value for obtaining the second quantized data. However, according to an embodiment, any one of the two computational values may be randomly selected.

The processor 120 may identify the computational value closest to the preset value as the quantized value corresponding to the weight value w1. As illustrated in reference numeral 230 of FIG. 2B, the processor 120 may identify min (±a2±a3±a4) as the quantized value corresponding to the weight value w1.

For example, among a plurality of computations using a plurality of scaling factors a2, a3, and a4, based on it being identified that the computational value based on a2-a3-a4 computation is a computational value closest to 0, the processor 120 may identify a computational value based on the a2-a3-a4 computation as a quantized value corresponding to the weight value w1. The processor 120 may obtain bit values [1, −1, −1] corresponding to a plurality of scaling factors a2, a3, a4 and w1 as second quantized data, and store the same in the memory 110. The processor 120 may store the binary data "100" corresponding to [1, −1, −1] in the memory 110.

Referring to FIG. 2B, the quantized weight data W may be represented as reference numeral 230 of FIG. 2B. The quantized weight data W may be represented as [min (±a2±a3±a4), a2·b22+a3 ⊀b32+a4·b42, a2·b23+a3·b33+ a4·b43, a2·b24+a3·b34+a4·b44]. The quantized weight values are as reference numeral 230 of FIG. 2B. The quantized weight data w1 may be expressed as min (±a2±a3±a4), quantized weight value w2 may be a2·b22+a3·b32+a4·b42, quantized weight value w3 may be a2·b23+a3·b33+a4·b43, and quantized weight value w4 may be a2·b24+a3·b34+ a4·b44.

Based on the value of each of the plurality of scaling factors being a2=0.8 a3=0.4 a4=0.1, the computational value closest to 0 is a2-a3-a4=0.3, and the plurality of quantized weight values are respectively b22=1, b32=−1, b42=−1, b23=1, b33=1, b43=1, b24=1, b34=1, and b44=−1, the processor 120 may obtain the plurality of scaling factor values, bit values [1, −1, −1] corresponding to w1, bit values [1, −1, −1] corresponding to w2, bit values [1, 1, −1] corresponding to w3, and bit values [1, 1, −1] corresponding to w4. The processor 120 may obtain binary data "100" corresponding to w1, binary data "100" corresponding to w2, binary data "110" corresponding to w3, and binary data "110" corresponding to w4.

The processor 120 may store the obtained first quantized data and the second quantized data in the memory 110. The stored quantized data may then be used in the computation of the neural network model or transmitted to an external device capable of performing the computation of the neural network model.

As described above, the disclosure may minimize the error of the output data while reducing the capacity of the weight data based on being compared to a case of quantizing all weight values by quantizing the weight data based on the remaining weight values except for a weight value having a small influence on the output data, that is, a weight value of less than or equal to a threshold value.

By replacing the weight value having a size less than or equal to a threshold value to a computational value closest to zero, instead of replacing the weight value to zero, there is no need to use a pruning mask to replace the weight value to zero, thereby preventing bit, for example 1 bit, consumption by the pruning mask.

There may be an effect of adding noise to the neural network model by replacing a weight value having a size less than or equal to a threshold value with a computational value closest to 0. The noise may help to improve the accuracy of output data, and may be used to reduce the error of output data in a learning process of the neural network model.

The method of quantizing the weight data based on the weight values other than the weight value having a size less than or equal to a threshold value has been described. However, the disclosure is not limited thereto, and the disclosure may perform quantization of weight data through various methods.

For example, the processor 120 may perform quantization of the weight data based on a clipping value. The processor 120 may clip the weight value of at least one of the weight values included in the weight data based on the clipping value, and may quantize the weight data including the clipped weight value. Here, clipping is to replace a weight value having a size greater than a clipping value with one of a (+) clipping value and a (−) clipping value, and based on the clipping value being Ck, the processor 120 may replace the weight value with a size greater than +Ck to +Ck, and may replace the weight value having a size greater than −Ck may be replaced by −Ck. For example, based on the clipping value being set to 1.3, the processor 120 may replace a value of 1.5 or 2.7 having a size greater than 1.3 among the weight values included in the weight data with 1.3, and may replace a value of −1.5 or −2.7 having a size greater than −1.3 with a value of −1.3. The processor 120 may quantize the weight data including the clipped weight value to obtain quantized data and store the quantized data in the memory 110. The clipping value may be set based on a user input for setting a clipping value. According to an embodiment, the clipping value may be set through an AutoML technology such as Bayesian optimization, as described above. Accordingly, embodiments may quantize the weight data based on the optimal clipping value that may efficiently lighten the neural network model without significantly losing the accuracy of the neural network model.

It has been described that the weight data is quantized based on [Equation 1] having an exponent value of 2. However, according to an embodiment, the processor 120 may quantize the weight data based on [Equation 1] having a different exponent value other than 2. For example, the processor 120 may quantize the weight data based on [Equation 1] where the exponent value 2 is replaced with a value of 1.3, 2.5, or the like. Meanwhile, the exponent value may be set based on a user input for setting an exponent value. According to an embodiment, the exponent value may be set through the AutoML technology such as Bayesian optimization, as described above. Accordingly, the disclosure may quantize weight data based on an optimal exponent value that may efficiently lighten the neural network model without significantly losing the accuracy of the neural network model.

FIGS. 3A and 3B are diagrams illustrating an embodiment of quantizing weight data based on importance according to an embodiment of the disclosure.

The method of quantizing the weight data based on the remaining weight values except for at least one weight value having a size less than or equal to a threshold value among the weight values is described. As described above, it is considered that the weight value having a size less than or equal to a threshold value has less influence on the output data, and may be of low importance.

The processor 120 may normalize the weight values included in the weight data based on importance in accordance with an embodiment, and quantize the normalized weight values. Similar to those described above, it is considered that a weight value having a low importance has a low influence on the output data.

The processor 120 may identify the size of the weight values included in the weight data and normalize the weight values based on the weight value having the largest size. For example, referring to FIG. 3A, based on the weight values w1, w2, w3, and w4 being included in the weight data W, the processor 120 may identify the size of each of the weight values w1, w2, w3, and w4 included in the weight data W, and normalize the weight data W in a manner that divides the weight value having the comparatively largest size among w1, w2, w3, and w4 with respect to of w1, w2, w3, and w4. The processor 120 may normalize the weight data W to [w1/w (max), w2/w (max), w3/w (max), w4/w (max)].

The size of the normalized weight value may be an indicator indicative of importance of the weight. The importance m1 of w1 may be |w1|/|w(max)|, the importance m2 of w2 may be |w2|/|w(max)|, and the importance m3 of w3 may be |w3|/|w(max)|, and the importance m4 of w4 may be |w4|/|w(max)|. Through this equation, the normalized weight value with high importance may have an importance close to 1, and the normalized weight value with low importance may have an importance close to 0.

The processor 120 may perform quantization based on the importance of the normalized weight values. The processor 120 may perform quantization on the weight values [w 1/w (max), w 2/w (max), w 3/w (max), and w 4/w (max)] based on the importance of the normalized weight values.

The quantization may be performed by various quantization algorithms as described above.

The technical idea of Equations 2 and 3 described above based on the binary code may be applied. However, m*w multiplied by the significance m instead of the weight value w of Equations 2 and 3 may be applied to Equations 2 and 3, and the values obtained by summing the significance m values instead of the n value of Equations 2 and 3 may be applied to Equations 2 and 3. For example, based on the normalized weight values being [w1/w (max), w2/w (max), w/w (max), w4/w (max)], the scaling factor based on k=1 may be (m1*w1+m2*w2+m3*w3+m4*w4)/(m1+m2+m3+m4), as shown in FIG. 3A. The quantized weight value may be determined based on the size, or code, of each of the normalized weight values similar to Equations 2 and 3 described above.

As such, the disclosure may perform quantization by applying a low importance to a weight value having a relatively small size, for example having a relatively small influence on output data, and by applying a high importance to a weight value, for example having a relatively high influence on output value, with a relatively large size, thereby outputting high accuracy output data and reducing the capacity of the weight data.

As an embodiment of normalizing the weight data based on the size of the weight value, the disclosure may perform weight data normalization based on a fisher value.

For example, referring to FIG. 3B, based on the weight values w1, w2, w3, and w4 being included in the weight data W, the processor 120 may identify a fisher value of each of the weight values w1, w2, w3, and w4 included in the weight data W, and normalize the weight data W in a manner of dividing the relatively largest fisher value by respective values f1, f2, f3, and f4. The processor 120 may normalize the weight data W to [f1/f (max), f2/f(max), f3/f(max), f4/f(max)].

The fisher value may be the value calculated by the fisher theory, and the fisher value may be a value that numerically indicates how much a particular value, for example a weight value, affects a different value, for example mean square error. Specifically, the processor 120 may calculate a gradient value of a weight value that is changed while performing back propagation, that is, a $\Delta g$ value as the fisher value of each weight. According to an embodiment, the processor 120 may calculate a value obtained by summing the obtained $\Delta g$ while performing a plurality of back propagation as a fisher value, and may calculate a value obtained by summing $(\Delta g)^2$ or $(\Delta g)^2$ as a fisher value of each weight.

The size of the normalized fisher value may be an index indicating the importance of the weight. The importance m1 of w1 may be $|f1|/|f(max)|$, the importance m2 of w2 may be $|f2|/|f(max)|$, importance m3 of w3 may be $|f3|/|f(max)|$, and importance m4 of w4 may be $|f4|/|f(max)|$. Through the equation, it may be seen that a normalized weight value having a high importance has an importance close to 1, and a normalized weight value having a low importance has an importance close to 0.

The processor 120 may perform quantization of the normalized weight values based on a fisher value. The processor 120 may perform quantization for [f1/f(max), f2/f(max), f3/f(max), f4/f(max)].

Here, quantization may be performed by various quantization algorithms as described above.

The technical ideas of Equations 2 and 3, which are based on a binary code, may be applied. However, instead of the weight value w of Equations 2 and 3, m*f in which importance m is multiplied by the fisher value f may be applied to Equations 2 and 3, and values obtained by summing the importance m values instead of n representing the number of weight values of Equations 2 and 3 may be applied to Equations 2 and 3. For example, as described above, based on the normalized weight values being [f1/f (max), f2/f (max), f3/f (max), f4/f (max)], the scaling factor based on k=1 may be $(m1*f1+m2*f2+m3*f3+m4*f4)/(m1+m2+m3+m4)$, as shown in FIG. 3B. The quantized weight value may be determined based on the size, or code, of each of the normalized weight values similar to Equations 2 and 3 described above.

As such, the disclosure may perform quantization by applying a low importance to a weight value having a relatively small fisher value for example having a relatively small influence on output data, and by applying a high importance to a weight value, for example having a relatively high influence on output data, with a relatively large fisher value, thereby outputting high accuracy output data and reducing the capacity of the weight data.

Figure 4:
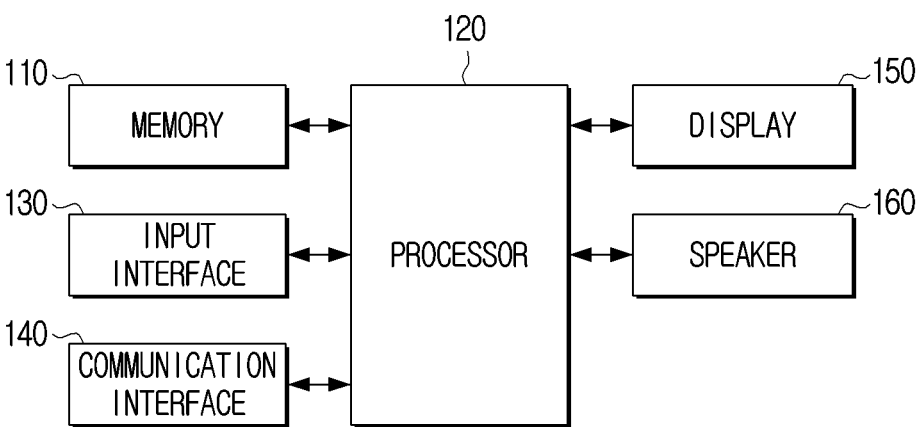
FIG. 4 is a detailed block diagram illustrating an electronic apparatus according to an embodiment.

FIG. 4 is a detailed block diagram illustrating an electronic apparatus according to an embodiment of the disclosure.

Referring to FIG. 4, the electronic apparatus 100 according to an embodiment may include the memory 110, the input interface 130, the communication interface 140, a display 150, a speaker 160, and the processor 120. A duplicate portion will be shortened or omitted.

The input interface 130 may receive a user command. The input interface 130 may include a touch sensor, a pen sensor, for example a digital pen sensor, a pressure sensor, a key, or the like. The touch sensor may use, for example, at least one of electrostatic, resistive, infrared, or ultrasonic methods. A pen sensor or digital pen sensor may, for example, be part of a touch panel or include a separate recognition sheet. The key may include, for example, a physical button, an optical key, or a keypad. The input interface 130 may include a microphone. The microphone may receive a user's uttered voice.

The communication interface 140 may communicate with an external device to transmit and receive various data. The communication interface 140 may receive a neural network model by communicating with an external device. The neural network model may include quantized weight data which is quantized through the quantization algorithm described above.

The communication interface 140 may include a wireless communication chip, a Wi-Fi chip, a Bluetooth chip, or the like.

The display 150 may display various screens. The display 150 may display a screen corresponding to the output data output by the neural network model. Here, the screen corresponding to the output data may be a message, an image, or the like generated based on the output data.

The display 150 may be implemented as various types of display technologies such as a liquid crystal display (LCD), organic light emitting diodes (OLED), active-matrix organic light-emitting diode (AM-OLED), liquid crystal on silicon (LcoS), digital light processing (DLP), or the like. The display 150 may be coupled to at least one of a front region, a side region, and a rear region of the electronic apparatus 100 in the form of a flexible display.

The display 150 may be implemented as a touch screen including a touch sensor.

The speaker 160 is configured to output various audio data on which various processes such as, for example, and without limitation, decoding, amplification, noise filtering, and the like, are performed by an audio processor. In addition, the speaker 160 may output various notification sounds or voice messages. According to the disclosure, based on the neural network model being compressed or output data being output by the neural network model, the speaker 160 may output an alarm sound or the like.

FIG. 5 is a flowchart illustrating a method of controlling an electronic apparatus according to an embodiment of the disclosure.

The electronic apparatus 100 may identify at least one weight value having a size less than or equal to a threshold value among weight values included in the weight data in operation S510. The weight data may be data used in the computation of the neural network model. The threshold value may be set based on a user input for setting a threshold value, as well as a user input for pruning rate setting.

The electronic apparatus 100 may, by quantizing remaining weight values other than the identified at least one weight value, among the weight values included in the weight data, obtain first quantized data including quantized values corresponding to the remaining weight values in operation S520.

The electronic apparatus 100 may identify a quantized value closest to a predetermined value among quantized values included in the first quantized data in operation S530. Here, the predetermined value may be zero.

The electronic apparatus 100 may obtain second quantized data including a quantized value corresponding to the at least one weight value based on a quantized value closest to a predetermined value in operation S540. The electronic apparatus 100 may identify the computational value closest to the preset value as a quantized value corresponding to the at least one weight value.

The electronic apparatus 100 may store the first quantized data and the second quantized data obtained by the electronic apparatus 100 in operation S550. The stored first quantized data and the second quantized data may be used when the electronic apparatus 100 performs computation of the neural network model. In embodiments, the electronic apparatus 100 may transmit the first quantized data and the second quantized data to an external device.

The methods according to various embodiments of the disclosure may be implemented in software or application form that may be installed in an existing electronic apparatus.

A non-transitory computer readable medium having a program for sequentially performing the control method of the electronic apparatus according to the disclosure may be provided.

The non-transitory computer-readable medium does not refer to a medium that stores data for a short period of time, such as a register, cache, memory, etc., but semi-permanently stores data and is available of reading by the device. Specifically, programs of performing the above-described various methods may be stored in a non-transitory computer readable medium such as a CD, a DVD, a hard disk, a Blu-ray disk, universal serial bus (USB), a memory card, ROM, or the like, and may be provided.

In addition, while example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic apparatus comprising:
a memory configured to store weight data used for computation of a neural network model; and
a processor configured to:
identify, from among weight values included in the weight data, at least one weight value having a size less than or equal to a threshold value,
quantize remaining weight values other than the identified at least one weight value to obtain first quantized data including quantized values corresponding to the remaining weight values,
identify, from among the quantized values, a quantized value closest to a predetermined value,
obtain second quantized data including a quantized value corresponding to the at least one weight value based on the quantized value closest to the predetermined value, store the first quantized data and the second quantized data in the memory,
quantize the neural network model by modifying the at least one weight value based on the second quantized data and modifying the remaining weight values based on the first quantized data to obtain a quantized neural network model, and
obtain output data by providing input data to the quantized neural network model.

2. The electronic apparatus of claim 1, wherein the processor is further configured to identify the quantized value closest to the predetermined value as the quantized value corresponding to the at least one weight value.

3. The electronic apparatus of claim 1, wherein the processor is further configured to:
based on the quantization of the remaining weight values, obtain the first quantized data including a plurality of scaling factors and bit values corresponding to the remaining weight values,
obtain a plurality of computational values based on computation using the plurality of scaling factors,
identify, from among the plurality of computational values, a computational value closest to the predetermined value, and
obtain the second quantized data based on the identified computational value.

4. The electronic apparatus of claim 3, wherein the processor is further configured to identify the computational value closest to the predetermined value as the quantized value corresponding to the at least one weight value.

5. The electronic apparatus of claim 3, wherein the processor is further configured to:
obtain the plurality of computational values by adding values obtained by multiplying each of the plurality of scaling factors by +1 or −1, and
identify the computational value closest to the predetermined value among the plurality of computational values.

6. The electronic apparatus of claim 3, wherein the processor is further configured to:
identify a first plurality of computations which output the computational value closest to the predetermined value among a second plurality of computations using the plurality of scaling factors,
identify, from among the first plurality of computations, a computation which outputs a computational value having a same code as a code of the at least one weight value, and
obtain the second quantized data based on the identified computation.

7. The electronic apparatus of claim 3, wherein the processor is further configured to:
identify codes of the plurality of scaling factors included in a computation, among a plurality of computations using the plurality of scaling factors, to output the computational value closest to the predetermined value, and
obtain the second quantized data based on the codes.

8. The electronic apparatus of claim 1, wherein the processor is further configured to:
receive a user input to set a pruning rate, and
identify the at least one weight value based on sizes of the weight values.

9. The electronic apparatus of claim 1, wherein the predetermined value is zero.

10. A method for controlling an electronic apparatus, the method comprising:

identifying, from among weight values included in weight data, at least one weight value having a size less than or equal to a threshold value;

quantizing remaining weight values other than the identified at least one weight value to obtain first quantized data including quantized values corresponding to the remaining weight values;

identifying, from among the quantized values, a quantized value closest to a predetermined value;

obtaining second quantized data including a quantized value corresponding to the at least one weight value based on the quantized value closest to the predetermined value; and storing the first quantized data and the second quantized data, quantizing the neural network model by modifying the at least one weight value based on the second quantized data and modifying the remaining weight values based on the first quantized data to obtain a quantized neural network model, and obtaining output data by providing input data to the quantized neural network model.

11. The method of claim 10, wherein the obtaining the second quantized data comprises identifying the quantized value closest to the predetermined value as the quantized value corresponding to the at least one weight value.

12. The method of claim 10, wherein the obtaining the first quantized data comprises, based on the quantization of the remaining weight values, obtaining the first quantized data including a plurality of scaling factors and bit values corresponding to the remaining weight values, and wherein the obtaining the second quantized data comprises:

obtaining a plurality of computational values based on computation using the plurality of scaling factors;

identifying, from among the plurality of computational values, a computational value closest to the predetermined value; and obtaining the second quantized data based on the identified computational value.

13. The method of claim 12, wherein the obtaining the second quantized data comprises identifying the computational value closest to the predetermined value as the quantized value corresponding to the at least one weight value.

14. The method of claim 12, wherein the identifying the computational value comprises:

obtaining the plurality of computational values by adding values obtained by multiplying each of the plurality of scaling factors by +1 or −1; and identifying the computational value closest to the predetermined value among the plurality of computational values.

15. The method of claim 12, wherein the obtaining the second quantized data comprises:

identifying a first plurality of computations which output the computational value closest to the predetermined value among a second plurality of computations using the plurality of scaling factors;

identifying, from among the first plurality of computations, a computation which outputs a computational value having a same code as a code of the at least one weight value; and obtaining the second quantized data based on the identified computation.

16. A method for controlling an electronic apparatus, the method comprising:

obtaining a weight values included in weight data of a neural network model;

selecting, from among the weight values, a first weight value to be pruned from the weight values;

quantizing remaining weight values other than the first weight value to obtain quantized weight values corresponding to the remaining weight values;

identifying, from among the quantized weight values, a smallest quantized weight value;

based on the smallest quantized weight value, determining a first quantized weight value corresponding to the first weight value;

storing the quantized weight values and the first quantized weight value;

quantize the neural network model by modifying the at least one weight value based on the second quantized data and modifying the remaining weight values based on the first quantized data to obtain a quantized neural network model; and performing a computation using the quantized neural network model.

17. The method of claim 16, wherein the smallest quantized weight value is determined as the first quantized weight value.

18. The method of claim 16, wherein the first weight value is selected based on a result of a comparison between the first weight value and a threshold value.

19. The method of claim 18, wherein the threshold value is set based on a user input.

20. The method of claim 19, wherein the threshold value is determined based on a pruning rate set based on the user input.

21. The electronic device of claim 1, further comprising normalizing the plurality of weight values based on fisher values corresponding to the plurality of weight values, wherein the quantized values are obtained based on the normalized plurality of weight values.

\* \* \* \* \*